T. A. WILLARD.
METHOD OF FORMING STORAGE BATTERY SEPARATORS.
APPLICATION FILED FEB. 26, 1915.
1,375,763.
Patented Apr. 26, 1921.
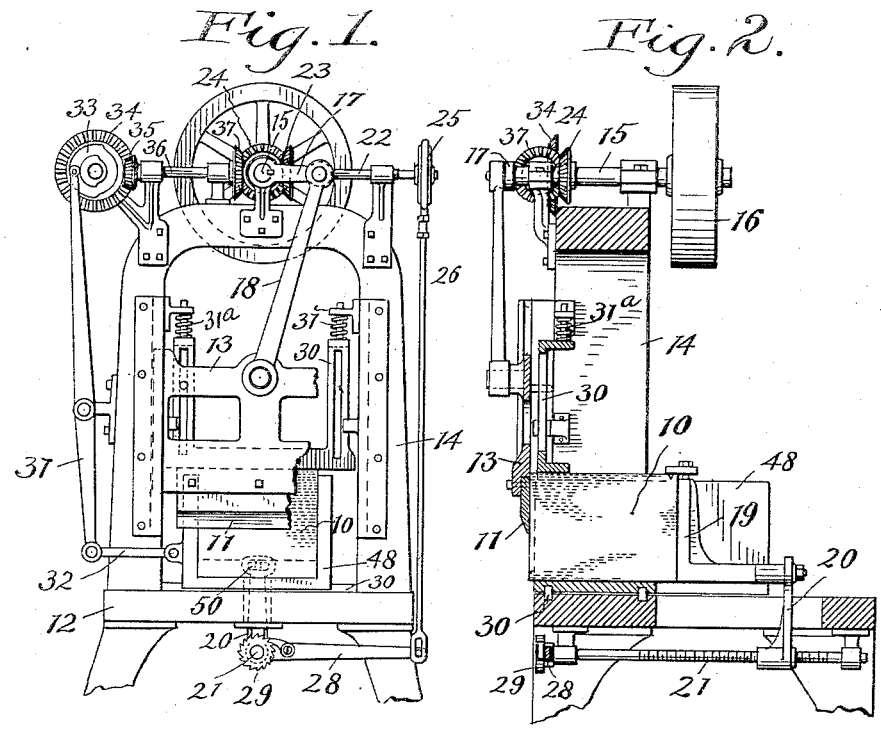
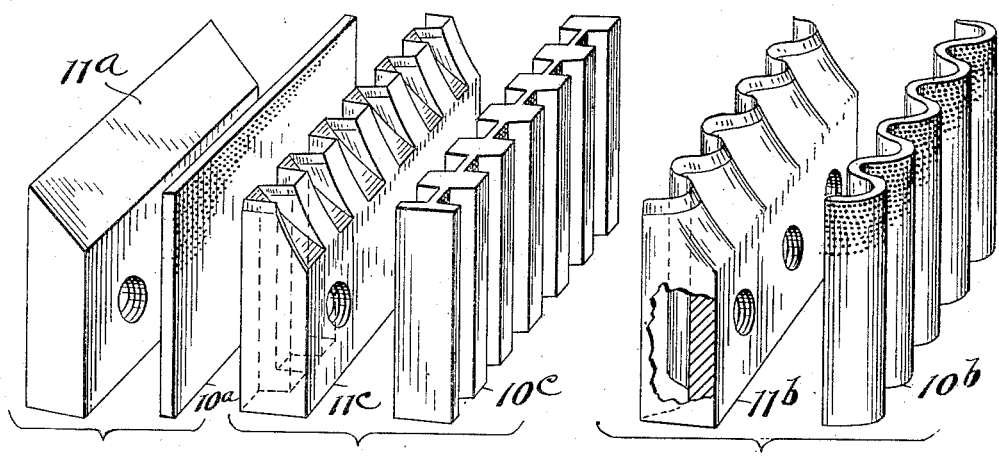
Witnesses.
Inventor.
Theodore A. Willard
by Thurston & Kwis
atty

UNITED STATES PATENT OFFICE.

THEODORE A. WILLARD, OF CLEVELAND, OHIO.

METHOD OF FORMING STORAGE-BATTERY SEPARATORS.

1,375,763.  Specification of Letters Patent.  Patented Apr. 26, 1921.

Application filed February 26, 1915. Serial No. 10,720.

*To all whom it may concern:*

Be it known that I, THEODORE A. WILLARD, a citizen of the United States, residing at Cleveland, in the county of Cuyahoga and State of Ohio, have invented a certain new and useful Improvement in Methods of Forming Storage-Battery Separators, of which the following is a full, clear, and exact description.

This invention relates to a method of forming storage battery separators and has for its object to reduce the cost, and at the same time increase the efficiency and durability of the separators.

Storage battery separators are generally provided on one or both sides with uneven surfaces such as are formed by corrugations, ribs or other projections. These uneven surfaces are produced from plain or flat surfaces in different ways, such as by grinding or cutting the surfaces, by cementing ribs or other projections thereto or by distorting flat separators or separator plates into shapes such that the uneven surfaces are obtained. These operations which are performed subsequent to the formation of the flat blank or separator plate increase the cost of the finished separator and have the further disadvantage that they do not produce the best results.

In carrying out my invention I cut the separators from a block or body which may be of any suitable material and form the uneven surfaces referred to by the use of a knife or blade which is so shaped that the uneven surfaces are produced when the separators are sliced or cut from the block.

My invention may be further briefly summarized as consisting in certain novel steps of the method which will be described in the specification and set forth in the appended claims.

In the accompanying sheet of drawings, Figure 1 is the front view of a slicing machine which is employed to simultaneously cut a block of separator material into separators or separator sections, and to form the uneven surfaces; Fig. 2 is a vertical section through the same; Fig. 3 shows perspective views, respectively, of a flat separator and of the knife employed to produce the same; Fig. 4 shows perspective views, respectively, of a corrugated separator which may be cut from the block, and of the knife which is employed to produce the same; and Fig. 5 shows perspective views, respectively, of a ribbed separator which may be cut from the block, and of the knife which is utilized to produce the same.

In carrying out my invention I employ some form of cutting apparatus which cuts or slices the separators from a block or body such as 10 in Figs. 1 and 2, and employ in this cutting apparatus a knife such as 11, which is so shaped that as it cuts the block into sections it produces during this cutting off action the uneven surfaces previously referred to. In the apparatus here shown the cutting machine includes a base 12 on which the block 10 is adapted to be supported and along which it is adapted to be fed. In the machine here shown the knife which cuts the block into the separators is carried by a cross head 13 which is actuated or reciprocated vertically and is guided in its vertical movements by parallel guide members or arms formed by a yoke 14 in the form of an inverted U extending upwardly from the base 12. Power may be applied to the apparatus for the purpose of actuating the knife and for other purposes such as for feeding the block, in any suitable manner, but in this instance a power shaft 15 is provided at the top of the yoke, this power shaft having a pulley 16 to which a belt may be connected and having at its forward end a crank arm 17 of the proper throw connected by a rod 18 to the cross head 13.

As each separator or separator section is sliced from the forward end of the block 10, the latter is fed forwardly one step equivalent to the thickness of the section cut from the block. In this instance the block 10 is seated in and is fed lengthwise through a U-shaped box 48 supported on the base 12, and the block is moved through this box 48 by a feeding or follower member 19 engaging the rear end of the block and actuated or fed forwardly by an arm 20 extending upwardly through a slot in the base 12 and mounted upon a threaded feeding shaft 21, which in this instance is turned intermittently by actuating mechanism connected to the shaft 15. This actuating mechanism includes a short horizontal shaft 22 arranged at the top of the machine and driven from the shaft 15 by a pair of bevel gears including a gear 23 on the shaft 22 and a gear 24 on the shaft 15. At the outer end of the shaft 22 is an eccentric 25 engaged by a strap connected to a rod 26 which extends downwardly to and is connected to an arm 28 at the bottom of the machine, this arm carrying a pawl for actuating a ratchet wheel 29 on the forward end of the feed shaft 21. Of course other feeding mechanism than the one here shown and above described may be employed. It will be understood, of course, that the amount of forward feed of the block 10 between successive downward strokes of the cutting blade may be varied in any suitable manner, such as by employing eccentrics 25 having different throws, so as to vary the thickness of the separator which is cut at each stroke from the block.

For the purpose of holding the block 10 down into the box 48 during the upward stroke of the knife, I provide above the block and adjacent its forward end a presser member 30 which is yieldingly pressed downwardly by springs 31$^a$ so as to bear onto the block and resist the upward movement of the block 10 when the blade is retracted or moved upwardly.

With this apparatus the uneven surfaces are produced as the separators are cut from the block and by varying the shape or form of the knife, the shape or contour of the sides of the separator may be varied, thus enabling me to produce or to obtain numerous forms of uneven surfaces, some of which I have shown in the drawings. For example, in Fig. 3 I have shown at 11$^a$ a knife for producing a plain or flat separator section 10$^a$, in Fig. 4 I have shown a knife 11$^b$ for producing a corrugated section 10$^b$, and in Fig. 5 I have shown a knife 11$^c$ for producing a ribbed separator 10$^c$.

It will be noted that the separator 10$^c$ of Fig. 5 has ribs on both sides, the ribs on one side being directly opposite those on the other side and that between the ribs are the relatively thin portions of the separator. This is a far more efficient construction than one wherein the ribs on one side are staggered relative to those on the other side.

In order that separators having oppositely disposed ribs instead of staggered ribs may be obtained by the cutting or slicing method herein disclosed, it is essential that between the cutting operations either the block 10 or knife 11$^c$ be laterally shifted, first in one direction and then in the other, a distance equal to the space between the ribs.

In this case the block 10 is shifted laterally, and for this purpose the box 48 is mounted on slides or guides 30 extending transversely of the base 12 and is moved back and forth over these guides by a rocking arm 31 which is pivoted between its ends on the yoke 14, this arm being connected at its lower end by a link 32 to the box 48 and at its upper end having a pin or roller engaging in a cam groove 33 which may be formed in the face of a bevel gear 34 driven by a smaller gear 35 mounted on a shaft 36 provided at its inner end with a bevel gear 37 which engages the bevel gear 24 which as previously stated is rotated by the power shaft 15. This oscillating attachment is essential only when the ribbed separator 10$^c$ is produced. When the corrugated separators are cut from the block, the oscillating attachment may be disconnected from the box by removing or disconnecting link 32.

In order that the oscillation of the block 10 and box 48 may not affect the forward feeding of the block through the box, the feeding arm 20 and the follower 19 are provided with a pin and slot connection shown at 50 by dotted lines in Fig. 1. This permits the follower 19 to oscillate relative to the arm 20.

The present invention is not limited to the use of a block 10 formed of any particular material or produced in any particular manner. I prefer, however, to employ a block which is formed or built up of layers of rubber coated cloth, as described in my Patent No. 1,243,370, granted October 16, 1917, for storage battery separator and process of producing the same. With the block of the character stated, the sections which are cut from the block have extending from side to side through the same the porous fibrous material which produces very minute and very closely and uniformly spaced pores extending from one face of the separator to the other.

Having thus described my invention, what I claim is:—

1. The method of forming porous storage battery separators which comprises slicing into sections a block containing porous material, with the sections provided in the slicing operations with uneven surfaces to form spacing projections.

2. The method of forming porous storage battery separators with spacing portions, which comprises slicing a block or body containing porous material into sections having uneven surfaces.

3. The method of forming porous storage battery separators with spacing portions, which comprises forming a block or body containing porous material and slicing the same into sections having other than flat surfaces.

4. The method of forming porous storage battery separators with spacing portions, which comprises forming a block or body containing porous material and slicing the same into sections having other than flat surfaces, and having the porous material extending from surface to surface therethrough.

5. The method of forming storage battery separators which comprises slicing a body of separator material into thin sections and during the cutting operations forming corrugated or undulating surfaces on the sections, firmly clamping the body adjacent the cutting plane during the cutting operation, and feeding the body forwardly a predetermined amount after each cutting operation.

6. The method of forming storage battery separators composed of rubber and fibrous material extending transversely therethrough from side to side which comprises slicing a body of rubber and fibrous material in a general direction at right angles to the fibrous material and during the cutting operations forming the cut surfaces in corrugated or undulating form, firmly clamping the body on four sides adjacent the cutting plane, and feeding the body forwardly a predetermined amount after each cutting operation.

In testimony whereof I hereunto affix my signature in the presence of two witnesses.

THEODORE A. WILLARD.

Witnesses:
A. F. KWIS,
C. V. SCHURGER.